(12) United States Patent
Krivenok et al.

(10) Patent No.: US 12,436,829 B2
(45) Date of Patent: Oct. 7, 2025

(54) MANAGING SERVERS USING POWER TRANSMISSION CIRCUITS

(71) Applicant: Dell Products L.P., Round Rock, TX (US)

(72) Inventors: Dmitry Vladimirovich Krivenok, Dublin (IE); Amitai Alkalay, Kadima (IL); Aric Hadav, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/372,227

(22) Filed: Sep. 25, 2023

(65) Prior Publication Data

US 2025/0103414 A1    Mar. 27, 2025

(51) Int. Cl.
| | |
|---|---|
| G06F 11/00 | (2006.01) |
| G06F 1/26 | (2006.01) |
| G06F 11/07 | (2006.01) |
| G06F 11/20 | (2006.01) |

(52) U.S. Cl.
CPC .......... G06F 11/0757 (2013.01); G06F 1/266 (2013.01); G06F 11/0727 (2013.01); G06F 11/2005 (2013.01); G06F 11/2007 (2013.01); G06F 11/2092 (2013.01)

(58) Field of Classification Search
CPC ............. G06F 11/0727; G06F 11/0751; G06F 11/0757; G06F 11/2005; G06F 11/2007; G06F 11/2028; G06F 11/2092; G06F 1/266; G06F 1/30
See application file for complete search history.

(56) References Cited

U.S. PATENT DOCUMENTS

| | | | | |
|---|---|---|---|---|
| 5,560,033 | A * | 9/1996 | Doherty | G06F 1/325 |
| | | | | 713/340 |
| 7,930,587 | B1 * | 4/2011 | Coatney | G06F 11/2033 |
| | | | | 714/6.32 |
| 8,239,518 | B2 | 8/2012 | Wipfel et al. | |
| 11,106,556 | B2 | 8/2021 | Koning et al. | |
| 11,133,842 | B1 | 9/2021 | Lai | |
| 11,340,967 | B2 | 5/2022 | Talukdar et al. | |
| 11,782,765 | B2 | 10/2023 | He et al. | |
| 2002/0152414 | A1 * | 10/2002 | Barron | H04L 67/12 |
| | | | | 714/4.5 |
| 2008/0040628 | A1 * | 2/2008 | Mandal | H04L 43/0817 |
| | | | | 714/4.1 |
| 2012/0330899 | A1 * | 12/2012 | Luo | G06F 11/1482 |
| | | | | 707/E17.005 |
| 2015/0019671 | A1 * | 1/2015 | Yasuda | H04L 43/10 |
| | | | | 713/320 |
| 2025/0007801 | A1 * | 1/2025 | Patil | G06F 1/266 |

* cited by examiner

*Primary Examiner* — Marc Duncan
*Assistant Examiner* — Albert Li
(74) *Attorney, Agent, or Firm* — BainwoodHuang

(57) ABSTRACT

A technique is directed to managing a server cluster that includes multiple servers. The technique involves receiving, from a server in the server cluster, set of heartbeat signals through a power transmission circuit constructed and arranged to deliver power to the server cluster. The technique further involves detecting an interruption in receiving the set of heartbeat signals. The technique further involves, in response to detecting the interruption in receiving the set of heartbeat signals, performing a remedial activity to coordinate input/output (I/O) operations among the multiple servers in the server cluster.

20 Claims, 7 Drawing Sheets

MANAGING SERVERS USING POWER TRANSMISSION CIRCUITS

BACKGROUND

A conventional data storage system typically includes storage servers that provide services (e.g., caching). These storage servers communicate with each other to coordinate data storage operations (e.g., to prevent data corruption).

The conventional data storage system may further include a witness device that includes circuitry to monitor, process, and report statuses of the storage servers through a computer network. By communicating with the storage servers, the witness device detects failures within the data storage system and coordinates with the storage servers to process the data storage operations.

SUMMARY

Unfortunately, use of such a witness device presents multiple challenges. For example, in addition to the witness device itself, additional infrastructure is required to connect the witness device to each of the storage servers in the data storage system and to maintain operation of the witness device (e.g., using cooling systems, power sources, etc.). These challenges add significant costs and take up a significant amount of space, which may be prohibitive, especially in small implementations (e.g., small, local "edge" environments).

In contrast with the above-described conventional data storage system, improved techniques are directed to managing a server cluster using a power transmission circuit. The improved techniques use the power transmission circuit to not only deliver power to the server cluster, but also to transmit heartbeat signals among servers in the server cluster. Upon detecting an interruption in the receipt of the heartbeat signals, the server cluster may coordinate input/output (I/O) operations among the servers. In this manner, the server cluster is able to effectively manage the servers and make appropriate operational decisions.

One embodiment is directed to a method of managing a server cluster that includes multiple servers. The method includes receiving, from a server in the server cluster, set of heartbeat signals through a power transmission circuit constructed and arranged to deliver power to the server cluster. The method further includes detecting an interruption in receiving the set of heartbeat signals. The method further includes, in response to detecting the interruption in receiving the set of heartbeat signals, performing a remedial activity to coordinate input/output (I/O) operations among the multiple servers in the server cluster.

Another embodiment is directed to electronic circuitry which includes memory and control circuitry coupled with the memory. The memory stores instructions, which, when carried out by the control circuitry, cause the control circuitry to perform a method of:
 (A) receiving, from a server in the server cluster, a set of heartbeat signals through a power transmission circuit constructed and arranged to deliver power to the server cluster;
 (B) detecting an interruption in receiving the set of heartbeat signals; and
 (C) in response to detecting the interruption in receiving the set of heartbeat signals, performing a remedial activity to coordinate input/output (I/O) operations among the multiple servers in the server cluster.

Yet another embodiment is directed to a computer program product having a non-transitory computer readable medium which stores a set of instructions to handle a storage device error. The set of instructions, when carried out by computerized circuitry, causes the computerized circuitry to perform a method of:
 (A) receiving, from a server in the server cluster, a set of heartbeat signals through a power transmission circuit constructed and arranged to deliver power to the server cluster;
 (B) detecting an interruption in receiving the set of heartbeat signals; and
 (C) in response to detecting the interruption in receiving the set of heartbeat signals, performing a remedial activity to coordinate input/output (I/O) operations among the multiple servers in the server cluster.

In some arrangements, the server cluster is constructed and arranged to perform the I/O operations to store host data into and retrieve the host data from a set of storage devices on behalf of a set of host computers. Additionally, receiving the set of heartbeat signals includes acquiring the set of heartbeat signals from the server while the I/O operations are performed.

In some arrangements, a computer network couples the multiple servers in the server cluster with each other. The computer network is different from the power transmission circuit. Additionally, the method further includes communicating with the server through the computer network to coordinate performing the I/O operations with the server.

In some arrangements, communicating with the server through the computer network includes, while receiving the set of heartbeat signals from the server through the power transmission circuit, receiving another set of heartbeat signals from the server through the computer network. Additionally, performing the remedial activity to coordinate the I/O operations among the multiple servers is further in response to detecting another interruption in receiving the other set of heartbeat signals through the computer network.

In some arrangements, the computer network includes a wireless transmitter coupled with the server. Additionally, receiving the other set of heartbeat signals from the server through the computer network includes acquiring the other set of heartbeat signals wirelessly through the computer network.

In some arrangements, detecting the interruption includes detecting a timeout event in which no heartbeat signal is received within a timeout period. Additionally, performing the remedial activity to coordinate the I/O operations among the multiple servers includes, in response to detecting the timeout event, prohibiting the server from performing further I/O operations.

In some arrangements, the set of heartbeat signals includes a first identifier of the server in the server cluster. Further, an identifying device is coupled with the power transmission circuit. The identifying device is constructed and arranged to provide a second set of heartbeat signals through the power transmission circuit. The second set of heartbeat signals includes a second identifier of the identifying device and is different from the first identifier. Additionally, the method further includes, while receiving the set of heartbeat signals from the server through the power transmission circuit, receiving a second set of heartbeat signals from the identifying device through the power transmission circuit.

In some arrangements, the method further includes detecting a second interruption in receiving the second set of heartbeat signals from the identifying device while detecting the interruption in receiving the set of heartbeat signals from the server. Additionally, performing the remedial activity to coordinate the I/O operations among the multiple servers includes, in response to detecting the second interruption in receiving the second set of heartbeat signals from the identifying device while detecting the interruption in receiving the set of heartbeat signals from the server, prohibiting the server from performing further I/O operations.

In some arrangements, another identifying device is coupled with another power transmission circuit constructed and arranged to deliver power to the server cluster. The other identifying device is constructed and arranged to provide a third set of heartbeat signals through the power transmission circuit. The third set of heartbeat signals includes a third identifier of the other identifying device and is different from both the first identifier and the second identifier. Additionally, the method further includes, after prohibiting the server from performing the further I/O operations, receiving the set of heartbeat signals from the server through the other power transmission line while receiving the third set of heartbeat signals from the other identifying device through the other power transmission line. Further, performing the remedial activity further includes, after receiving the set of heartbeat signals from the server through the other power transmission line while receiving the third set of heartbeat signals from the other identifying device through the other power transmission line, allowing the server to perform the further I/O operations.

In some arrangements, the server cluster includes a power supply unit (PSU) and a signal adapter coupled with the PSU, the signal adapter being constructed and arranged to acquire the set of heartbeat signals from a power signal provided to the PSU. Additionally, receiving the set of heartbeat signals through the power transmission circuit includes:

(A) receiving the power signal through the power transmission circuit, the power signal including the set of heartbeat signals and providing power to the PSU; and (B) acquiring the set of heartbeat signals from the power signal.

In some arrangements, the server includes (i) a management controller constructed and arranged to coordinate the I/O operations among the multiple servers in the server cluster and (ii) a processor constructed and arranged to perform the I/O operations. Additionally, the set of heartbeat signals includes (i) a first set of signals of the management controller and (ii) a second set of signals of the processor. Further, the method further includes, after receiving the set of heartbeat signals through the power transmission circuit, identifying the first set of signals and the second set of signals included in the set of heartbeat signals.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other objects, features, and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing a server cluster using a power transmission circuit. The improved technique uses the power transmission circuit to carry not only power to the server cluster, but also heartbeat signals among servers in the server cluster. Upon detecting an interruption in receiving the heartbeat signals, the server cluster may coordinate input/output (I/O) operations among the servers in the server cluster. In this manner, the server cluster is able to effectively manage the servers and reduce instances of data loss or data unavailability.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
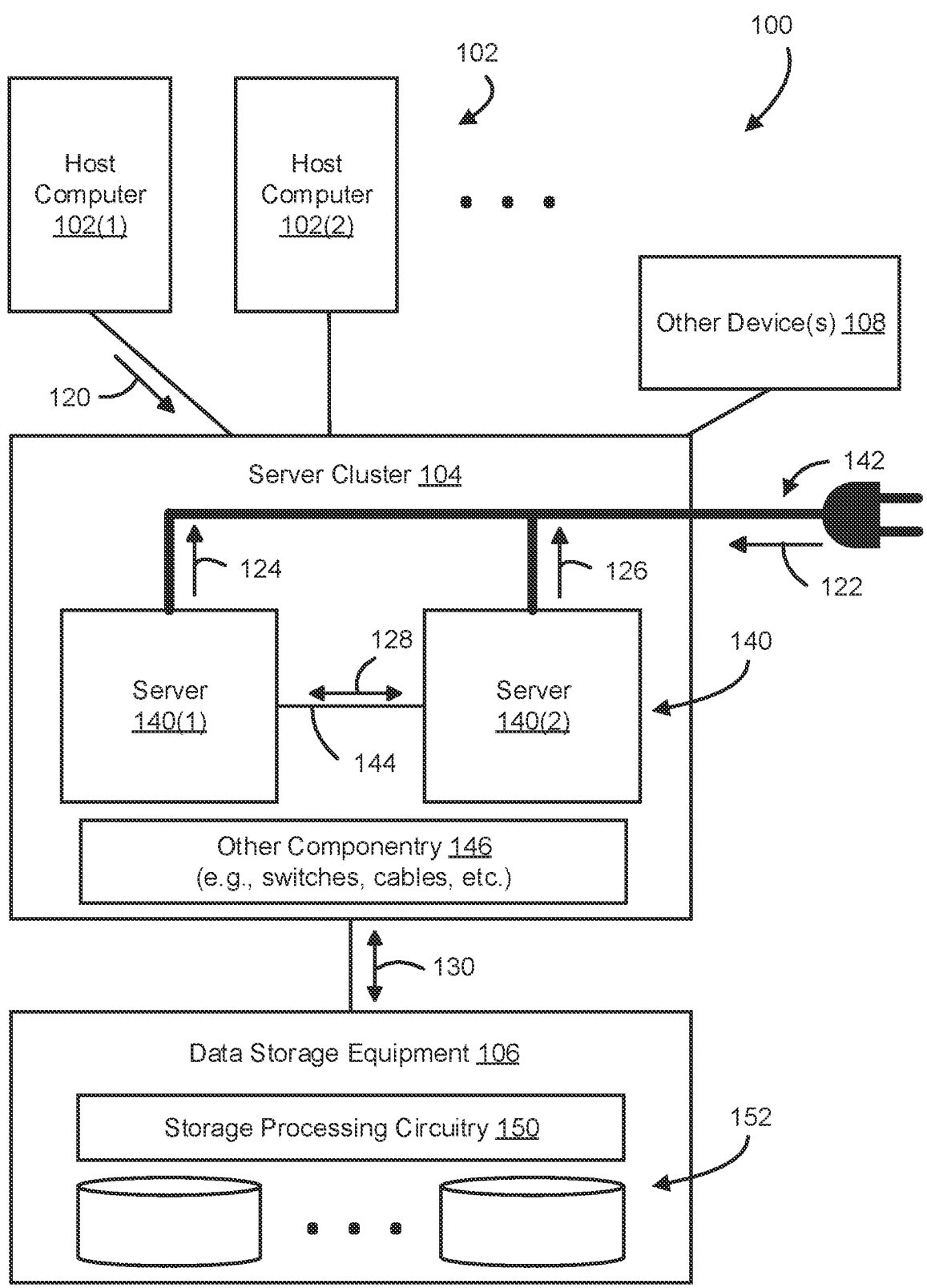
FIG. 1 is a block diagram of an example environment in accordance with certain embodiments.

FIG. 1 shows an example environment 100 that provides storage cluster management in accordance with certain embodiments. The example environment 100 includes host computers 102(1), 102(2), . . . (collectively, host computers 102), server cluster 104, and data storage equipment 106, and perhaps other devices 108.

Each host computer 102 is constructed and arranged to perform useful work. For example, host computer 102 may issue host I/O requests 120 to server cluster 104 to store host data 130 into or retrieve the host data 130 from storage.

Server cluster 104 is a group of servers constructed and arranged to communicate with each other to coordinate I/O operations. The server cluster 104 includes server 140(1) and server 140(2) (collectively, servers 140). In some embodiments, one or more of the servers 140 may operate as a file server, a web server, an email server, an enterprise server, a database server, a transaction server, combinations thereof, etc. which provide instructions to the data storage equipment 106. In this context, the servers 140 process the host I/O requests 120 and direct the data storage equipment 106 to richly and reliably store the host data 130 into and retrieve the host data 130 from storage (e.g., primary storage or main memory, secondary storage, tiered storage, combinations thereof, etc.). It should be understood that the servers 140(1) and 140(2) are provided for example purposes, and in some embodiments, the server cluster 104 includes additional servers.

Power transmission circuit 142 is constructed and arranged to deliver power 122 to each of the servers 140 in the server cluster 104. In some embodiments, the power 122 is street power. In other embodiments, the power transmission circuit 142 delivers the power 122 from a generator or battery. Further, in some embodiments, the power transmission circuit 142 is configured to deliver power having particular characteristics, e.g., AC power and/or DC power.

The power transmission circuit 142 is further constructed and arranged to carry communications between the servers 140 along with the power 122. For example, in some embodiments, the server 140(1) provides a set of heartbeat signals 124 to the server 140(2) through the power transmission circuit 146, and the server 140(2) provides another set of heartbeat signals 126 to the server 140(1) through the power transmission circuit 146. Suitable forms of heartbeat signals include differential signals, radio frequency (RF) signals, pulses, combinations thereof, etc.

The servers 140 are further constructed and arranged to exchange data communications 128 through a computer network 144. The computer network 144 is constructed and arranged to have a variety of different topologies including backbone, hub and spoke, loop, irregular, combinations thereof, and so on. Along these lines, in certain embodiments, the computer network 144 includes copper-based data communications devices and cabling, fiber optic devices and cabling, wireless devices, combinations thereof, etc. Furthermore, in some embodiments, the computer network 144 is constructed and arranged to support LAN-based communications, SAN-based communications, cellular communications, WAN-based communications, distributed infrastructure communications, other topologies, combinations thereof, etc.

The server cluster 104 also includes other componentry 146. For example, in some embodiments, the server cluster 104 further includes switches, buses, cabling, adaptors, auxiliary apparatuses, other specialized componentry, etc. for wired and/or wireless communication with the host computers 102, the data storage equipment 106, and the other devices 108.

The data storage equipment 106 (e.g., a storage array, a storage system, etc.) includes storage processing circuitry 150 and storage devices 152. The storage processing circuitry 150 is constructed and arranged to respond to instructions from the servers 140 by writing data into the storage devices 152 and reading the data from the storage devices 152. In some embodiments, at least a portion of the servers 140 and the data storage equipment 106 (e.g., the storage processing circuitry 150, the storage devices 152, etc.) are directly coupled together and/or contained within the same housing, chassis, rack, etc.

In some embodiments, the storage processing circuitry 150 includes one or more physical storage processors (SPs) or engines, data movers, director boards, blades, I/O modules, storage device controllers, switches, other hardware, combinations thereof, and so on. In some embodiments, the storage devices 152 provide persistent/non-volatile storage in accordance with one or more RAID data protection schemes and include one or more types of storage drives, e.g., non-volatile random access memory (NVRAM) devices, solid state drives (SSDs), hard disk drives (HDDs), combinations thereof, and so on.

In some embodiments, at least some of the storage devices 152 provide non-volatile storage using a mapped-RAID architecture. Moreover, in some embodiments, various physical componentry may be virtualized for additional flexibility, fault tolerance, load balancing, and so on (e.g., virtual data movers, virtual storage devices, etc.).

During operation, the servers 140 communicate with each other through the computer network 144 to perform I/O operations (e.g., to write the host data 130 to and read the host data 130 from storage). Simultaneously with communicating through the computer network 144, the servers 140 receive the power 122 and exchange the sets of heartbeat signals 124 and 126 through the power transmission circuit 142. Upon detecting an interruption in receiving a set of heartbeat signals, the servers 140 perform remedial activities to coordinate the I/O operations (e.g., prohibiting both of the servers 140 from operating independently from the other). Further details will now be provided with reference to FIG. 2.

Figure 2:
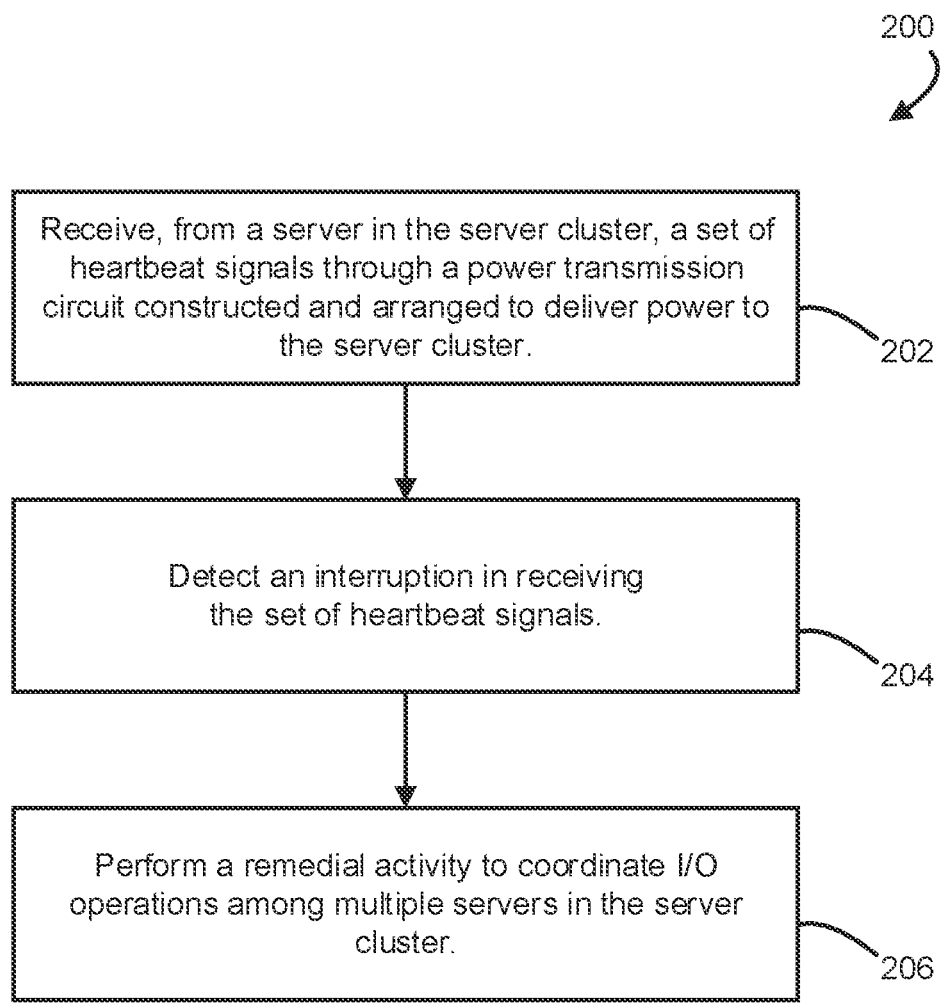
FIG. 2 is a flowchart of a procedure which is performed by specialized equipment in accordance with certain embodiments.

FIG. 2 is a flowchart of a procedure 200 that is performed by the server 140(1) in accordance with certain embodiments. The procedure 200 carries out management of the storage cluster 104 using the power transmission circuit 142.

At 202, the server 140(1) receives, from the server 140(2) in the server cluster 104, the set of heartbeat signals 124(2) through the power transmission circuit 142. The power transmission circuit 142 is constructed and arranged to deliver the set of heartbeat signals 124(2) simultaneously with the power 122 to the server cluster 104. In some embodiments, the server 140(2) is constructed and arranged to provide heartbeat signals at a predefined rate, e.g., every 100 milliseconds. In some embodiments, the heartbeat signals in the set of heartbeat signals 124(2) are provided individually, e.g., as discrete pulses. In some embodiments, the set of heartbeat signals 124(2) is a single, continuous signal having a particular waveform, e.g., sine, square, triangle, sawtooth, etc.

At 204, the specialized equipment detects an interruption in receiving the set of heartbeat signals 124(2). In some embodiments, detecting the interruption includes detecting a timeout event in which no heartbeat signal is received within a timeout period. In some embodiments, the timeout period is a predefined length of time, e.g., 30 seconds. In some embodiments, the interruption is caused by a failure within the server 140(1), the server 140(2), and/or the power transmission circuit 142.

At 206, the server 140(1) performs a remedial activity to coordinate I/O operations among the multiple servers 140 in the server cluster 104. In some embodiments, performing the remedial activity includes preventing one or more of the servers 140 from performing the I/O operations. In some embodiments, performing the remedial activity includes outputting an alert to inform a user of the server cluster 104 of a communications error.

At least in part, the procedure 200 enables the server cluster 104 to avoid data corruption by preventing situations in which both of the servers 140 operate independently from each other. For example, suppose that the server 140(1) detects an interruption in receiving the set of heartbeat signals 126. In this example, the server 140(1) still receives the power 122 to operate, indicating that the power transmission circuit 142 has not failed. In this example, the interruption indicates a failure in the server 140(2) providing the set of heartbeat signals 126. As a result, the server 140(2) will be prevented from performing I/O operations while the server 140(1) will continue to operate. In this manner, the procedure 200 enables the server cluster 104 to continue operating while avoiding data corruption (e.g., by preventing the servers 140 from writing different data to the same storage location). Further details will now be provided with reference to FIG. 3.

Figure 3:
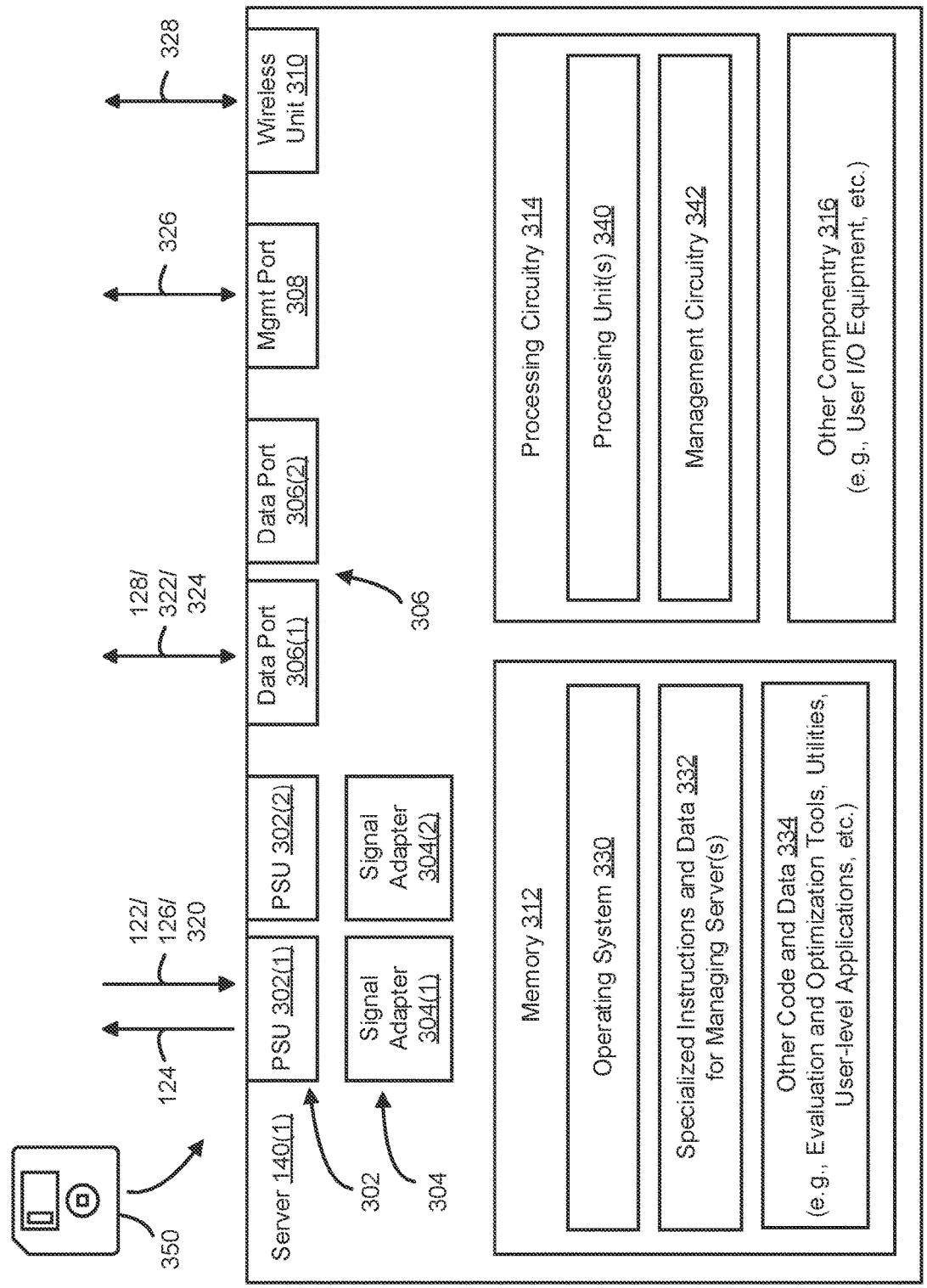
FIG. 3 is a block diagram of a server in accordance with certain embodiments.

FIG. 3 is a block diagram of the server 140(1) in the server cluster 104. The server 140(1) includes power supply units (PSUs) 302(1) and 302(2) (collectively, PSUs 302), signal adapters 304(1) and 304(2) (collectively, signal adapters 304), data ports 306(1) and 306(2) (collectively, data ports 306), management port 308, wireless unit 310, memory 312, processing circuitry 314, and other componentry 316. In some embodiments, other servers in the server cluster 104 (e.g., the server 140(2), etc.) have similar components, topologies, and/or connections and are constructed and arranged to perform similar functions.

The PSUs 302 are constructed and arranged to connect with power transmission circuitry (e.g., the power transmission circuit 142) to receive power to run the server 140(1). As shown, PSU 302(1) is connected with the power transmission circuit 142 and receives a power signal 320 through the power transmission circuit 142. In certain embodiments, the power signal 320 not only includes the power 122, but also includes the set of heartbeat signals 126 from server 140(2).

The PSUs 302 are coupled with respective signal adapters 304. For example, PSU 302(1) is coupled with signal adapter 304(1), and PSU 302(2) is coupled with signal adapter 304(2). The signal adapters 304 are constructed and arranged to acquire a set of heartbeat signals (e.g., the set of heartbeat signals 126) from the power signal 320 and provide the set of heartbeat signals to other componentry within the server 140(1) (e.g., processing circuitry 314). Further, the signal adapters 304 are constructed and arranged to adapt signals to be provided through the power transmission circuit 142 (e.g., from the processing circuitry 314). For example, in some embodiments, the server 140(1) uses one or more of the signal adapters 304 to provide the set of heartbeat signals 124 through the power transmission circuit 142.

The data ports 306 are constructed and arranged to provide access to one or more computer networks. For example, in some embodiments, the server 140(1) uses one or more of the data ports 306 to send and receive the data communications 128 over the computer network 144 (FIG. 1). In some embodiments, the data ports 306 connect to separate computer networks, e.g., to provide redundancy. In some embodiments, the data ports 306 are Gigabit Ethernet (GbE) ports.

In some embodiments, the server 140(1) is constructed and arranged to send and receive multiple sets of heartbeat signals through separate communications channels. For example, the server 140(1) receives the set of heartbeat signals 126 through the power transmission circuit 142 and further receives another set of heartbeat signals 322 through the computer network 144. Likewise, the server 140(1) sends the set of heartbeat signals 124 through the power transmission circuit 142 and further sends another set of heartbeat signals 324 through the computer network 144. Advantageously, sending and receiving multiple sets of heartbeat signals through separate communications channels enables the servers 140 to detect different points of failure, including failures within one or more of the servers 140 or one or more of the communications channels. As discussed in further detail below, the servers 140 are constructed and arranged to perform different remedial activities when different sets of heartbeat signals are interrupted.

The management port 308 is constructed and arranged to provide management communications 326 among the servers 140. The management communications 326 enable the servers 140 to coordinate I/O operations. In some embodiments, the management communications 326 include out-of-band communications, while the data communications 128 include in-band communications. In some embodiments, management port 308 is a Gigabit Ethernet (GbE) port.

The wireless unit 310 is constructed and arranged to send and receive wireless communications 328 among the servers 140. In some embodiments, the wireless communications 328 sent using the wireless unit 310 are independent of communications sent using wired connections, e.g., through the computer network 144. Advantageously, providing both a wired network and a wireless network enables a failure of the wired network to be fully independent of the wireless network. In some embodiments, the wireless unit communicates through Wi-Fi, Bluetooth Low Energy (BLE), or other communications protocols.

It should be understood that each of the components illustrated in FIG. 3, including the PSUs 302, the signal adapter 304, the data ports 306, the management port 308, and the wireless unit 310 are provided for example purposes, and in some embodiments, the server 140(1) includes more or fewer of each component.

The memory 308 represents both volatile storage (e.g., DRAM, SRAM, etc.) and non-volatile storage (e.g., flash memory, magnetic memory, etc.). The memory 308 stores a variety of software constructs including an operating system 330, specialized instructions and data 332, and other code and data 334.

The operating system 330 refers to particular control code such as a kernel that manages computerized resources (e.g., processor cycles, memory space, etc.), the I/O stack (e.g., drivers), and so on.

The specialized instructions and data 332 are particular instructions and data for managing one or more of the servers 140 in the server cluster 104. In some embodiments, the specialized instructions and data 332 are tightly integrated with or part of the operating system 330 itself. In some embodiments, the other code and data 334 include applications and routines to provide additional operations and services (e.g., performance measurement tools, etc.), user-level applications, administrative tools, utilities, and so on.

The processing circuitry 310 is constructed and arranged to operate in accordance with the various software constructs stored in the memory 308. As will be explained in further detail shortly, the processing circuitry 310 executes the operating system 330 and the specialized instructions and data 332 to form specialized circuitry that robustly and reliably performs I/O operations, manages one or more of the servers 140 in the server cluster 104, etc.

As shown, the processing circuitry 310 is implemented via one or more processing units (or cores) 340 and additional management circuitry 342. Together, the one or more processing unit 340 and the management circuitry 342 run specialized software, application specific ICs (ASICs), field programmable gate arrays (FPGAs) and associated programs, discrete components, analog circuits, other hardware circuitry, combinations thereof, and so on. In some embodiments, the management circuitry 342 is a separate board, device, chip, controller, etc. coupled with the processing units 340 and communicates with in other servers to coordinate I/O operations within the server cluster 104. For example, in some embodiments, the management circuitry 342 is a base media controller (BMC) or other management controller coupled with the processing units 340. In some embodiments, the management circuitry 342 provides the management communications 324 transmitted through a connection to the management port 308.

In some embodiments, each of the sets of heartbeat signals 124 and 126 provide status updates of multiple components of a respective server. For example, in some embodiments, the set of heartbeat signals 124 includes a first set of signals of the management circuitry 342 and a second set of signals of the processing units 340. Advantageously, providing sets of heartbeat signals including signals of multiple components enables the servers 140 to detect different types of failures or losses of communication (e.g., a loss of communication with the management circuitry 342, a loss of communication with the processing units 340 etc.). These features enable particularized remedial activities to be taken (e.g., preventing one or more of the servers 140 from performing I/O operations, raising an alert, etc.).

The management circuitry 342 and the one or more processing units 340 operate in combination to manage the servers 140 in the server cluster 104. For example, in some embodiments, the one or more processing units 340 run an application to manage server clustering, and the management circuitry 342 runs a clustering agent that provides information about the server cluster 104.

In the context of one or more processors executing software, a computer program product 350 is capable of delivering all or portions of the software constructs to the server 140(1). In particular, the computer program product 350 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD ROM, flash memory, disk memory, tape memory, and the like.

The other componentry 312 refers to other hardware of the server 140(1). Along these lines, the server 140(1) may further include special user I/O equipment (e.g., a service processor), buses, cabling, adaptors, auxiliary apparatuses, other specialized data storage componentry, etc. In some embodiments, the other componentry 312 also includes other interfaces constructed and arranged to connect the server 140(1) to one or more computer networks to enable communications with other servers in the server cluster 104. In some embodiments, the communications adhere to one or more communications protocols, e.g., communications that are IP-based, SAN-based, cellular-based, cable based, fiber-optic based, wireless, cloud-based, combinations thereof, and so on. Additionally, the other interface(s) 306 are constructed and arranged to connect the server 140(1) to other equipment such as the host computers 102 and the set of storage devices 152. In some embodiments, the other interface(s) 306 include one or more host interfaces (e.g., a computer network interface, a fibre channel interface, etc.), one or more storage device interfaces (e.g., a host adapter or HBA, etc.), and so forth. As a result, the other interface(s) 306 enable the server 140(1) to robustly and reliably communicate with various apparatus. Further details will now be provided with reference to FIG. 4.

Figure 4:
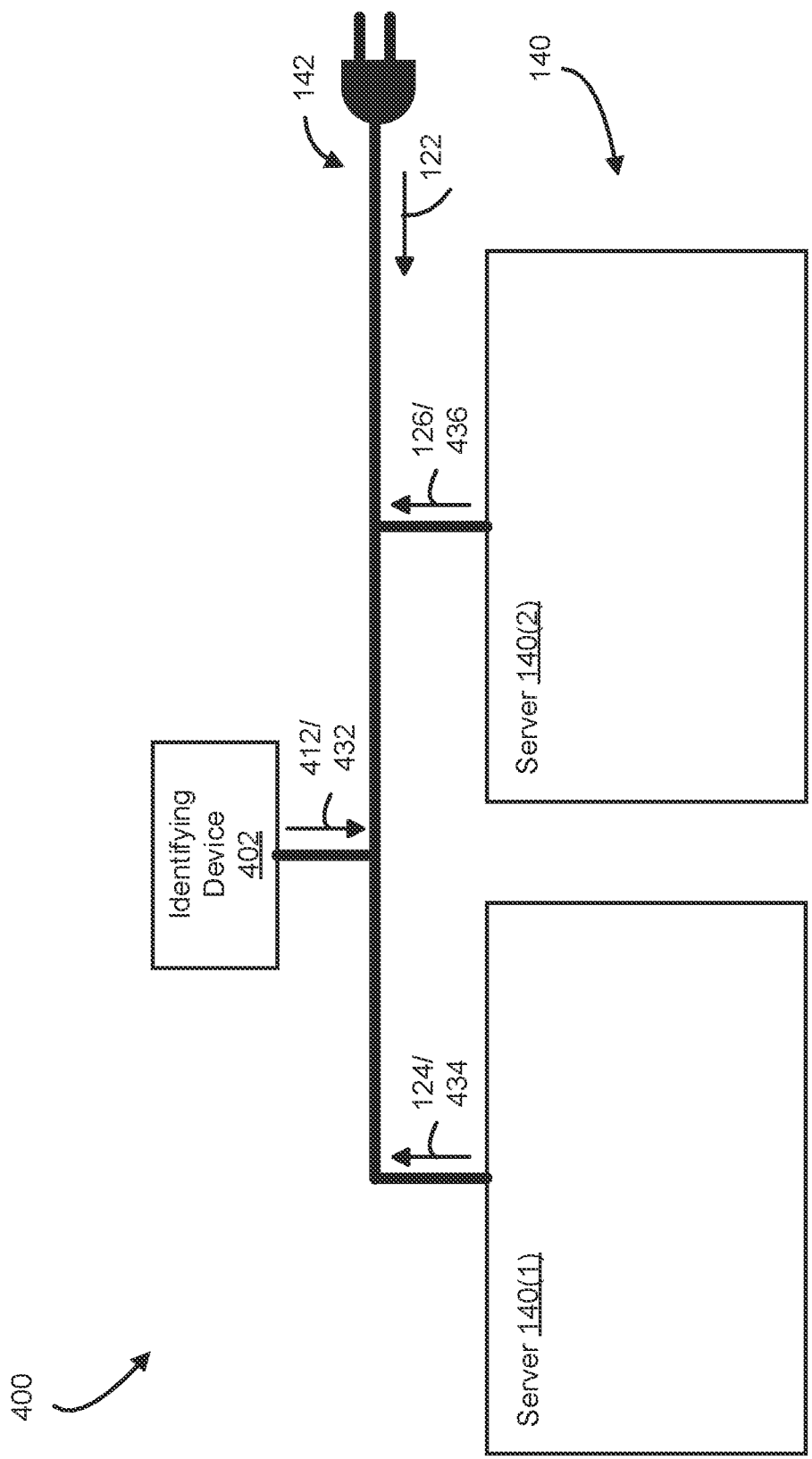
FIG. 4 is a block diagram of an example embodiment including an identifying device in accordance with certain embodiments.

FIG. 4 is a block diagram of an example environment 400 showing additional details of the power transmission circuit 142. As shown, the power transmission circuit 142 is coupled with the servers 140(1) and 140(2) and is further coupled with an identifying device 402.

It should be understood that FIG. 4 provides a simplified view of the components of example environment 400. For example, in some embodiments, the server 140(1) includes the componentry illustrated in and described in connection with FIG. 3. Further, in some embodiments, the servers 140(1) and 140(2) have similar components, topologies, and/or connections and are constructed and arranged to perform similar functions.

As shown, the identifying device 402 is constructed and arranged to provide a set of heartbeat signals 412 through the power transmission circuit 142. In some embodiments, the identifying device 402 is constructed and arranged to provide heartbeat signals at a predefined rate, e.g., every 100 milliseconds. In some embodiments, the set of heartbeat signals 412 includes an identifier 432 of the identifying device 402. In some embodiments, the identifiers 432 is a universally unique identifier (UUID).

Further, as described above, the server 140(1) provides the set of heartbeat signals 124, and the server 140(2) provides the set of heartbeat signals 126. In some embodiments, the set of heartbeat signals 124 includes an identifier 434 of the server 140(1), and the set of heartbeat signals 126 includes an identifier 436 of the server 140(2). In this manner, the identifiers 432, 434, and 436 distinctly identify different components providing respective sets of heartbeat signals.

In some embodiments, the power transmission circuit 142 provides street power through a set of electrical outlets. In these embodiments, the servers 140 and the identifying device 402 receive the power 122 while plugged into respective electrical outlets in the set of electrical outlets.

Advantageously, operating the identifying device 402 enables the servers 140 to detect different types of failures or losses of communication (e.g., one of the servers 140 being disconnected from the power transmission circuit 142, the power transmission circuit failing, etc.). These features enable particularized remedial activities to be taken (e.g., preventing one or more of the servers 140 from performing I/O operations, raising an alert, etc.). Further, operating the identifying device 402 enables the servers 140 to identify misconfigurations, e.g., when the servers 140 are erroneously connected to separate power transmission circuits. Further details will now be provided with reference to FIG. 5.

Figure 5:
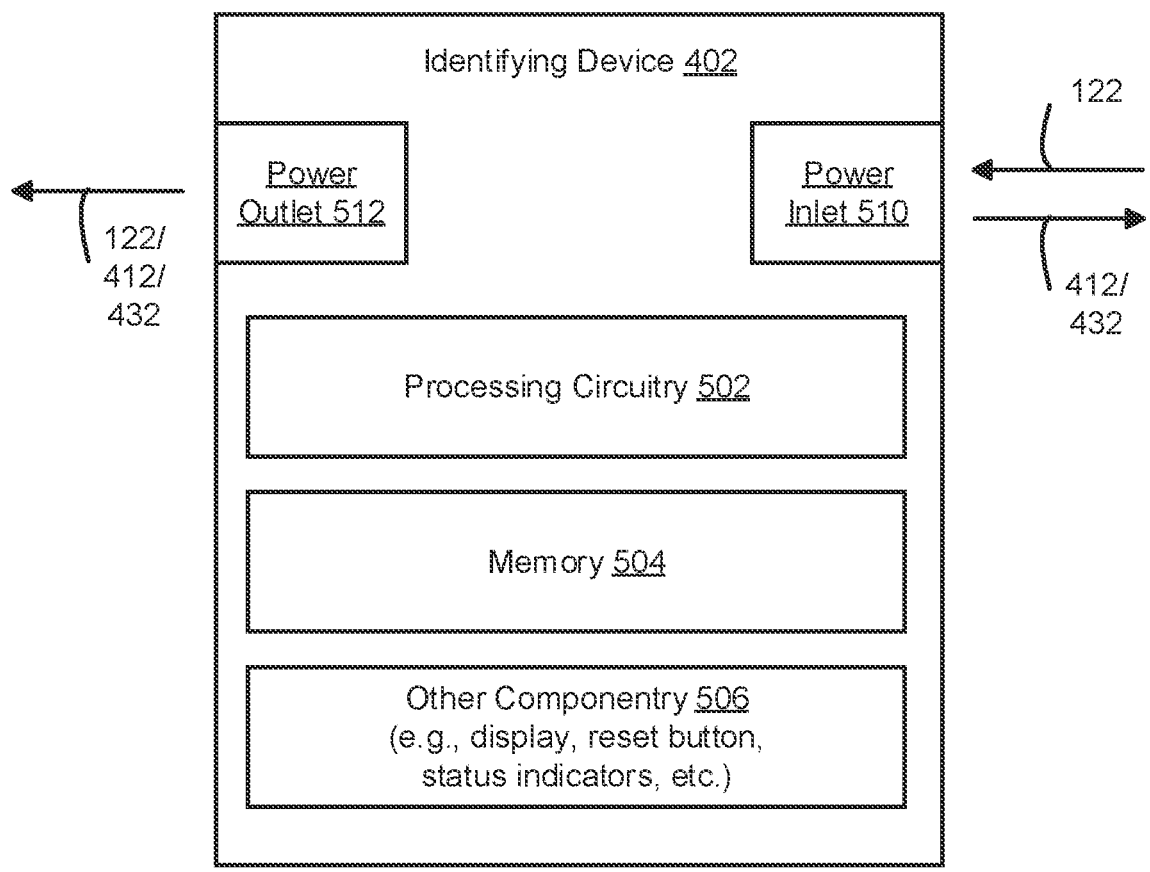
FIG. 5 is a block diagram of an identifying device in accordance with certain embodiments.

FIG. 5 is a block diagram that illustrates additional details of identifying device 402. As shown, the identifying device 402 include processing circuitry 502 (e.g., a microcontroller) and memory 504 (e.g., to provide persistent storage for identifier 432). The processing circuitry 502 provides the identifier 432 in the set of heartbeat signals 412 through the power transmission circuit 142. In some embodiments, the processing circuitry 502 generates the identifier 432 on initiation and stores the identifier 432 in persistent memory of the memory 504. In some embodiments, the processing circuitry 502 further provides a runtime ID (e.g., a random number stored in non-persistent memory of the memory 504), a protocol version number, and other identifying information. In some embodiments, the identifying device 402 further includes other componentry 506, e.g., a display constructed and arranged to present all or a portion of the identifier 432, a reset button to reset the identifier 422, an LED status indicator, etc.

Additionally, in some embodiments, the identifying device 402 provides pass-through power, e.g., to provide the power 122 to another device coupled with the identifying device 402. For example, in some embodiments, the identifying device 402 receives the power 122 through power inlet 510 and provides the power 122 to a device coupled with the identifying device 402 at power outlet 512. In this manner, the power transmission circuit 142 provides the power 122 to both the identifying device 402 and the device coupled with the identifying device at the power outlet 512. In some embodiments, the identifying device 402 provides the set of heartbeat signals 412 (including the identifier 432) at both the power inlet 510 and the power outlet 512. In some embodiments, one of the servers 140 is coupled with the identifying device at the power outlet 512.

It should be appreciated that implementing the identifying device 402 does not require additional network cables or attachments to other components (e.g., management switches, etc.). Additionally, in some embodiments, the identifying device 402 is a low-cost device that consumes a relatively low amount of power and occupies a small amount of physical space.

It should be understood that the identifying device 402 is provided for example purposes, and in some embodiments, the example environment 400 includes additional identifying devices coupled with the power transmission circuit 142. Further details will now be provided with reference to FIG. 6.

Figure 6:
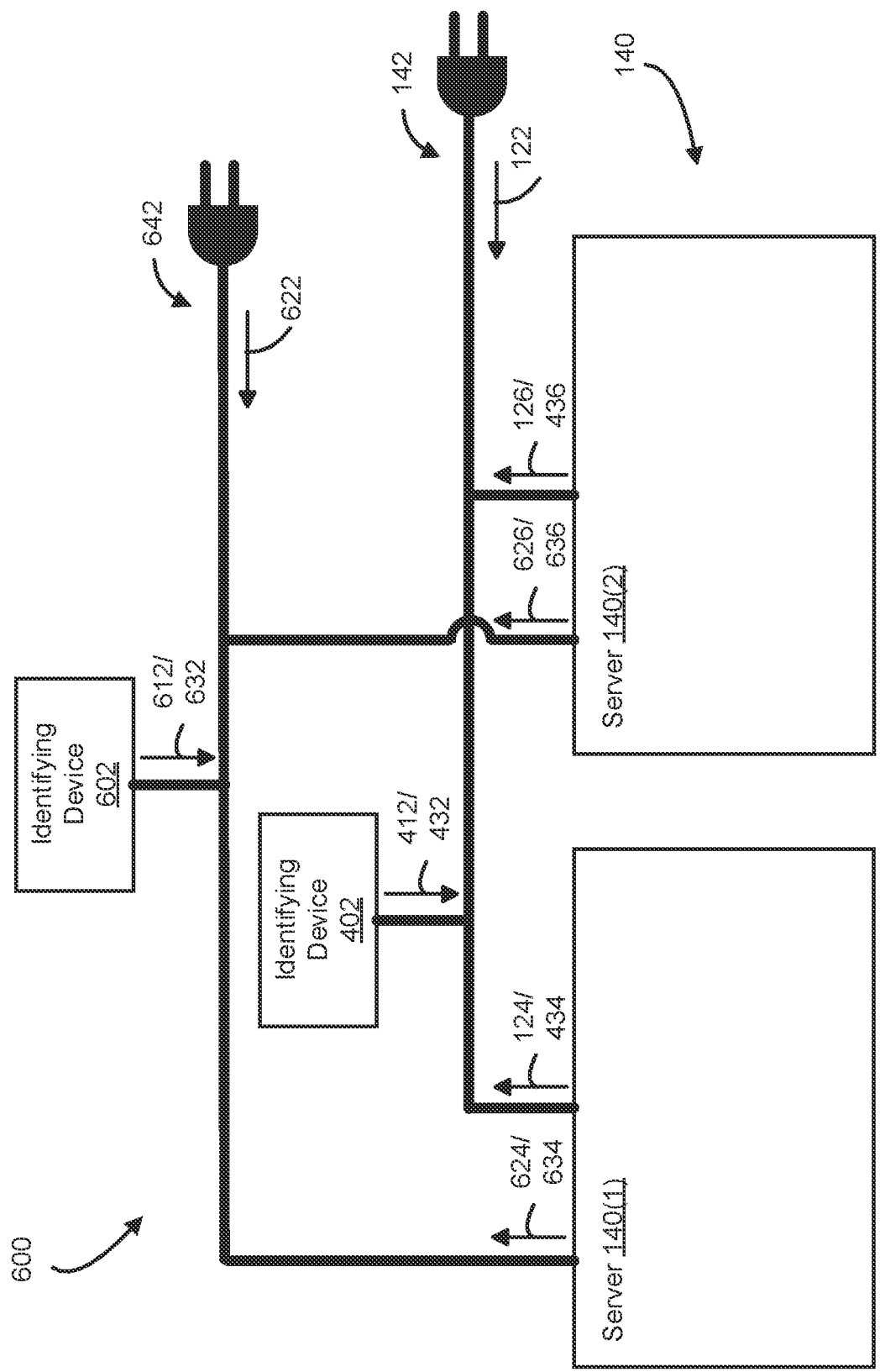
FIG. 6 is a block diagram of an example embodiment including multiple power transmission circuits in accordance with certain embodiments.

FIG. 6 is a block diagram of an example environment 600 that includes multiple power transmission circuits. As shown, the power transmission circuit 142 is coupled with servers 140(1) and 140(2) and the identifying device 402. Additionally, another power transmission circuit 642 is coupled with the servers 140(1) and 140(2) and another identifying device 602.

Similar to the power transmission circuit 142, the power transmission circuit 642 is constructed and arranged to carry communications between the servers 140 (e.g., a set of heartbeat messages 624 including identifier 634 of the server 140(1), and a set of heartbeat messages 626 including identifier 636 of the server 140(1)) along with power 622. The power transmission circuit 642 is separate from the power transmission circuit 142. For example, in some embodiments, when the power transmission circuit 142 fails, the servers 140 continue to operate by receiving the power 622 through the power transmission circuit 642. In some embodiments, each of the servers 140 includes multiple PSUs coupled with respective power transmission circuits (e.g., server 140(1) includes PSUs 302(1) and 302(2), where PSU 302(1) is coupled with the power transmission circuit 142 and the PSU 302(2) is coupled with the power transmission circuit 642).

Identifying device 602 is constructed and arranged to provide a set of heartbeat signals 612 through the power transmission circuit 642. The set of heartbeat signals 612 includes an identifier 632 of the identifying device 602. In some embodiments, identifying devices 402 and 602 have similar components and are constructed and arranged to perform similar functions.

In some embodiments, the servers 140 assign priority levels to the multiple identifiers 432 and 632. These priority levels enable the servers 140 to perform one or more remedial activities to prevent data corruption and/or maintain data availability. In some embodiments, a server in the servers 140 is constructed and arranged to cease performing I/O operations after detecting an interruption in receiving a set of heartbeat signals that includes an identifier having a particular priority level, e.g., the highest priority identifier.

For example, suppose that the servers 140 assign a higher priority to the identifier 432 and a lower priority to the identifier 632. Further, suppose that the server 140(1) experience a failure of the PSU 302(1) coupled with the power transmission circuit 142. In this example, the server 140(1) remains powered, as the power transmission circuit 642 continues to power the server 140(1). However, because of the failure of the PSU, the server 140(1) detects an interruption in receiving the set of heartbeat signals 412 that includes the higher priority identifier 432. As a result, the server 140(1) ceases to perform I/O operations.

It is noted that, in this example, the server 140(2) continues to perform the I/O operations, as the server 140(2) continues to receive the set of heartbeat signals 412 that includes the higher priority indicator 432. In this manner, the servers 140 will not both operate independently from the other, avoiding the risk of data corruption.

Although the above example involves a failure of the PSU 302(1), in other examples, the server 140(1) detects an interruption due to other failures. In some examples, a failure of the signal adapter 304(2), failure of the power transmission circuit 142, and/or disconnecting the server 140(1) from the power transmission circuit 142 results in the server 140(1) results in an interruption in receiving the set of heartbeat signals 412.

In some embodiments, the servers 140 assign the priority levels at a predetermined time, e.g., when the server cluster 104 (FIG. 1) is formed. In some embodiments, the servers 140 use a predetermined criteria to assign priority levels, e.g., ordering the indicators by numerically lower UUID. In some embodiments, the highest priority indicator is stored in persistent memory in each of the servers 140.

In some embodiments, the servers 140 are constructed and arranged to automatically renegotiate priority levels of identifiers. For example, suppose that the servers 140 assign a higher priority to the identifier 132 and a lower priority to the identifier 632 and further suppose that the server 140(1) is disconnected from the power transmission circuit 142. As a result, the server 140(1) no longer receives a set of heartbeat signals 412 that include the higher priority indicator 432, and would otherwise cease performing I/O operations. However, in this example, both of the servers 140 detect the set of heartbeat signals 612 that include the lower priority identifier 632. As a result, the servers 140 promote the identifier 632. In this manner, the servers 140 resume performing I/O operations without risk of data corruption. Further details will now be provided with reference to FIG. 7.

Figure 7:
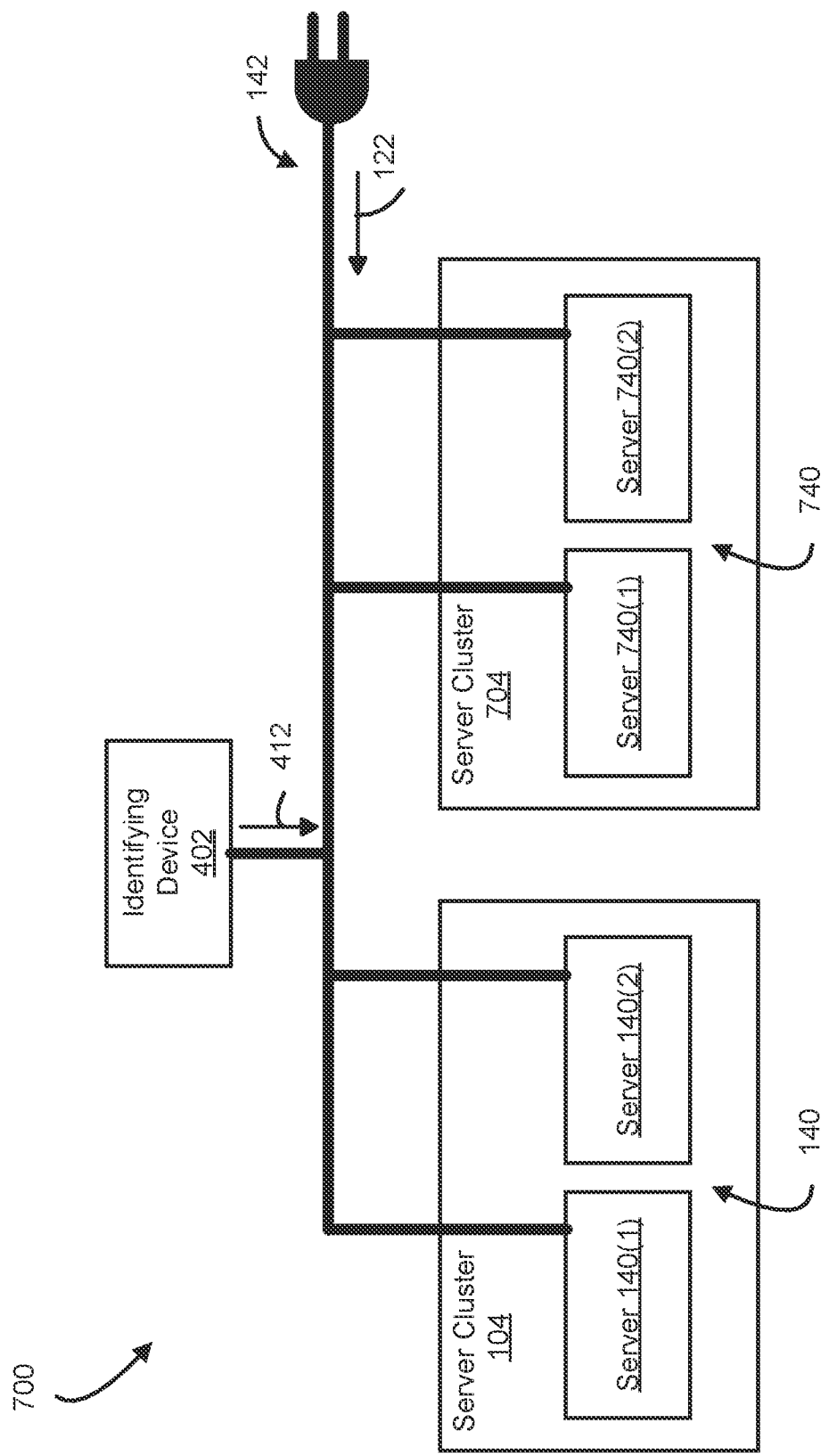
FIG. 7 is a block diagram of an example embodiment including multiple server clusters in accordance with certain embodiments.

FIG. 7 is a block diagram of an example environment 700 in which a single identifying device provides a set of heartbeat signals to multiple server clusters. As shown, the power transmission circuit 142 is coupled with the identifying device 402, the servers 140 in the server cluster 104, and other servers 740(1) and 740(2) (collectively, servers 740) in another server cluster 704. The identifying device 402 provides the set of heartbeat signals 412 to both server clusters 104 and 704 through the power transmission circuit 142.

In the example environment 700, server cluster 104 is independent from server cluster 704, e.g., server cluster 104 does not exchange data communications with server cluster 704 to perform I/O operations. The server cluster 104 uses the set of heartbeat signals 412 to manage the servers 140. Likewise, the server cluster 704 uses the same set of heartbeat signals 412 to manage the servers 740.

In some embodiments, the identifying device 402 is constructed and arranged to provide the set of heartbeat signals 412 without receiving and processing communications from either of the server clusters 104 and 704. Advantageously, these features enable the identifying device 402 to support the server clusters 104 and 704 even when the server clusters 104 and 704 are not in communication and/or operate using different protocols.

As described above, improved techniques are directed to managing a server cluster using a power transmission circuit. The improved techniques use the power transmission circuit to not only deliver power to the server cluster, but also to transmit heartbeat signals among servers in the server cluster. Upon detecting an interruption in the receipt of the heartbeat signals, the server cluster may coordinate input/output (I/O) operations among the servers. In this manner, the server cluster is able to effectively manage the servers and make appropriate operational decisions.

One should appreciate that the above-described techniques do not merely collect and store data. Rather, the disclosed techniques include receiving signals from a server in a server cluster. Accordingly, such techniques enable the server cluster to manage operation of the servers without causing data corruption.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the example environment 100 such as the data storage equipment 106, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

Some embodiments leverage networking over powerline for communication between nodes using embedded powerline adapters (ePLs). In some examples, different power types are used for messaging over power (e.g., 50/400 hz AC, low/high line, DC, etc.). An important property of powerline technologies that is valuable in context of small two-node clusters is that it removes ambiguity between partitioning and failure.

For example, suppose a node A is a local node running a clustering software and node B is an identical remote node. Further, suppose node A connects to node B via powerline connection within the same power domain (PD) (e.g., a power circuit providing the same broadcast domain via powerline technology). In general, if node A does not receive heartbeat messages from node B, then node B is down. If power domain itself is broken, then node A will be down as well. If node A's attachment to the power domain via PSU is broken, then node A will also be down. In this manner, using powerline removes ambiguity between network partitioning and peer node failure. Partitioning automatically means failure of both nodes at the same time eliminating concern of "split brain" (e.g., where multiple nodes perform I/O operations independently of each other, creating a risk of data loss). Failure is immediately detectable as loss of heartbeat messages from the peer, so again we can continue operating alone without the risk of split brain.

| View of peer clustering app in OS from local node | View of peer clustering agent in mgmt controller from local node | Conclusion |
|---|---|---|
| Powerline: OK<br>Eth/wireless: OK | Powerline: OK<br>Eth/wireless: OK | Operating normally |
| Powerline: NOK<br>Eth/wireless: NOK | Powerline: NOK<br>Eth/wireless: NOK | Assume peer is dead, continue alone without explicit fencing Peer to negotiate/rejoin on recovery Assume peer OS is not stalled because mgmt controller is not reachable also |
| Powerline: NOK<br>Eth/wireless: OK | Powerline: NOK<br>Eth/wireless: OK | Different power domains, asymmetric PSU failures Policy defines the behavior, e.g.: Raise alert and continue dual node Raise alert and close gates until powerline is fixed or witness is added Raise alert and close gates on one node |
| Powerline: OK<br>Eth/wireless: NOK | Powerline: OK<br>Eth/wireless: NOK | Mgmt network failure, powerline okay Assume powerline used for clustering only, so fence the peer via clustering agent and continue alone |
| Powerline: NOK<br>Eth/wireless: NOK | Powerline: OK<br>Eth/wireless: OK | Clustering app, storage VM and/or base OS is frozen or base OS/VM is rebooting Fence the peer via clustering agent and continue alone May also rely on self-fencing of peer |
| Powerline: OK<br>Eth/wireless: OK | Powerline: NOK<br>Eth/wireless: NOK | Something is bad with clustering agent (restart due to failure or upgrade, etc.) Raise alert and continue dual-node |
| Powerline: OK<br>Eth/wireless: NOK<br>Powerline: NOK<br>Eth/wireless: OK | Powerline: NOK<br>Eth/wireless: OK<br>Powerline: OK<br>Eth/wireless: NOK | Asymmetric SW/HW failure or intermediate state Raise alert and continue dual-node |

Some embodiments further include a powerline witness (PLW) device. In some embodiments, the PLW plugs into the power domain and enables another device to be connected to the power domain through it—this is a nice property for small environments because it allows PLW deployment with one of the cluster nodes and does not require dedicated attachment to the power domain.

In some embodiments, the PLW does not have external Ethernet port. Further, in some embodiments, the PLW has a small, embedded microcontroller, an embedded powerline interface for the microcontroller, <1 Kb of persistent storage for persistence of UUID, a small display capable of presenting UUID or subset of UUID (optional), a reset button to reset UUID (optional), and a LED (optional). In some embodiments, when PLW is first powered on, it generates an UUID, persists it into embedded persistent storage and starts showing it on the display.

In some embodiments, once the UUID is generated, the microcontroller starts to periodically (with configurable interval defaulting to 100 ms) broadcast a network packet which contains UUID, runtime ID (just a random number generated on PLW start and not persisted), protocol version number, and some pre-defined "magic number" that identifies the PLW. There are multiple ways how this may be implemented including raw Ethernet frames, UDP packets, etc. Some embodiments multicast the network packet rather than broadcast. Some embodiments add a security payload in addition to raw UUID.

In some embodiments, a user connects exactly one PLW to each power domain where cluster nodes may be potentially connected to. The PLW may be connected separately or one of the cluster nodes may be connected to power domain through PLW.

Optionally. PLW may implement receive function in addition to send function. It may receive network packets via an embedded powerline adapter (ePL) and if the protocol version number and the "magic number" match, the PLW looks at the UUID inside the packet. If the UUID is different from the persisted one, then the other PLW is connected to the same power domain and PLW may switch the LED from green to orange (e.g., to indicate that multiple PLWs are coupled with the same power domain). If UUID is the same as persisted one, then either a UUID collision happened (highly unlikely) or the network is badly misbehaving, and frames are relayed back to the sender (if runtime ID matches ours). In this case, the PLW may switch the LED from green to red, change frequency, and/or perform other remedial activities. In addition to the LED, the PLW may report an unexpected UUID on the display if there is enough space on it (e.g., to simplify the troubleshooting).

By plugging the PLW into a power domain, the PLW essentially provides an identity to the previously anonymous power domain. In addition to that, now there is a small independent always-on entity in the power domain which is independent from all cluster nodes. In some embodiments, the PLW is very low cost, has very low power consumption, has very low space requirements (does not even require new attachment to the power domain because it may sit between power domain and one of the nodes), and does not require any new network cables or attachment to management switches.

In some embodiments, each node listens on ePL interface(s) and reads the PLW UUID and the runtime ID, as well as checking the version number and the magic number. When the cluster is first formed, the nodes negotiate (e.g., using the main management networking) to decide which PLW to use. In some embodiments, the nodes select exactly one {UUID, Runtime ID} pair and agree to use it. In these embodiments, the UUID of the selected PLW is then persisted on both nodes, and it will be used until a new PLW is elected either automatically, or manually by the user.

The table below shows what a single node may see via its ePL(s) and different corner cases which are possible.

| Node A ePL 1 | Node A ePL 2 | Comment |
| --- | --- | --- |
| UUID U1, runtime ID I1 | N/A (single ePL) | Sees one PLW U1 consistently-this is expected behavior |
| UUID U1, runtime ID I1 UUID U2, runtime ID I2 | N/A (single ePL) | Sees two PLWs U1 and U2 connected to the same power domain (PD). |
| UUID U1, runtime ID I1 . . . | | |

-continued

| Node A ePL 1 | Node A ePL 2 | Comment |
| --- | --- | --- |
| No packets seen UUID U1, runtime ID I1 | N/A (single ePL) UUID U3, runtime ID I3 | PLW is not attached to PD. PSUs behind ePLs are connected to different PDs U1 and U3. |
| UUID U1, runtime ID I1 | UUID U1, runtime ID I1 | PSUs behind ePLs are connected to the same PD U1. |
| UUID U1, runtime ID I1 | No packets seen | PLW is not attached to PD behind ePL 2. |

The visibility of the PLWs may be different not only via different ePLs, but also across nodes. However, the fact that nodes negotiate which PLW to use and stick to it means that various asymmetric failures and misconfigurations will not lead to split brain.

In some embodiments, when cluster is first formed, nodes agree on a PLW to use. If the nodes are attached to separate power domains, then they will not be able to agree on a single {UUID, Runtime ID} pair. As a result, there is no risk of split-brain.

If one node is shut down and moved to a different power domain, it will detect either that there is no PLW in the new power domain or that there is a PLW with a different {UUID, Runtime ID} in that new power domain. In response, the node will not open its gates and will raise an alert, and as a result, there will be no split brain. If both nodes were moved to different power domains, then both will not open the gates and it will be data unavailability, but not data loss.

In some embodiments, when cluster is first formed, the nodes detect two separate power domains via different PSUs/ePLs and hence see two {UUID, Runtime ID} pairs. In these embodiments, both nodes automatically decide which UUID to use (e.g., using a predetermined criterion like numerically lower UUID wins), persist it, and stick to it. If PSU 1 fails on node A and PSU 2 fails on node B (i.e., we have asymmetric failure), a node which sees heartbeat messages from the elected PLW continues to work while another node closes the gates.

In some embodiments, when power domain goes down, the PLW goes down and both nodes (still working off UPS) stop seeing each other as well as the PLW. This is a signal for the nodes to close the gates causing data unavailability, but not data loss. If power domain goes back up, connectivity restores, and nodes re-negotiate. If not, both nodes will power off while in close gates state when UPS goes down. Again, there is no risk of split brain and no data loss.

In some embodiments, when the ePL fails on a node, the node stops seeing its peer and heartbeats from the PLW. This is a signal for the node to close the gates. Another node will continue working as long as it still sees the promoted PLW.

In some embodiments, the PLW does not need to receive anything from the nodes (and even know that cluster nodes exist) and does not need to report its "view of the world" to the nodes. For example, in these embodiments, the PLW need not include information about its visibility of the nodes in the heartbeat messages so that the nodes understand that the PLW sees both nodes. This aspect means that the PLW is not tightly coupled with the nodes because the PLW need not must know about the nodes. In this manner, the same PLW may be used with many different clustered systems as long as they add support of PLW (PLW does not need to know about them at all). This makes this solution applicable to wide range of small clustered systems.

In some embodiments, the cluster may self-heal itself and automatically re-negotiate which PLW to use. For example, if nodes have two ePLs and the power domain with a promoted PLW has failed, then the nodes may automatically promote another PLW visible via different ePLs as long as both nodes receive the same {UUID, Runtime ID} pair. In another example, if the nodes have both been moved from PD1 to PD2 which has different PLW, then the nodes may automatically promote the new PLW as long as both nodes receive the same {UUID, Runtime ID} pair. In these examples, at any moment, exactly one PLW is used for clustering decisions.

In some embodiments, if a node does not see its peer and the promoted PLW, then it does not automatically join the cluster and remains in a close-gates state, waiting for either the PLW or the peer to appear or a user to manually promote another PLW.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing a server cluster that includes multiple servers, the method comprising:
   receiving, from a server in the server cluster, a set of heartbeat signals through a power transmission circuit constructed and arranged to deliver power to the server cluster;
   detecting an interruption in receiving the set of heartbeat signals; and
   in response to detecting the interruption in receiving the set of heartbeat signals, performing a remedial activity to coordinate input/output (I/O) operations among the multiple servers in the server cluster;
   wherein the set of heartbeat signals includes a first identifier of the server in the server cluster;
   wherein an identifying device is coupled with the power transmission circuit, the identifying device being constructed and arranged to provide a second set of heartbeat signals through the power transmission circuit, the second set of heartbeat signals including a second identifier of the identifying device, the second identifier being different from the first identifier; and
   wherein the method further comprises:
      while receiving the set of heartbeat signals from the server through the power transmission circuit, receiving the second set of heartbeat signals from the identifying device through the power transmission circuit.

2. The method of claim 1 wherein the server cluster is constructed and arranged to perform the I/O operations to store host data into and retrieve the host data from a set of storage devices on behalf of a set of host computers; and
   wherein receiving the set of heartbeat signals includes:
      acquiring the set of heartbeat signals from the server while the I/O operations are performed.

3. The method of claim 1 wherein a computer network couples the multiple servers in the server cluster with each other, the computer network being different from the power transmission circuit; and
   wherein the method further comprises:
      communicating with the server through the computer network to coordinate performing the I/O operations with the server.

4. The method of claim 3 wherein communicating with the server through the computer network includes:
   while receiving the set of heartbeat signals from the server through the power transmission circuit, receiving another set of heartbeat signals from the server through the computer network;
   wherein performing the remedial activity to coordinate the I/O operations among the multiple servers is further in response to detecting another interruption in receiving the other set of heartbeat signals through the computer network.

5. The method of claim 4 wherein the server includes a wireless transmitter constructed and arranged to provide signals through the computer network; and
   wherein receiving the other set of heartbeat signals from the server through the computer network includes:
      acquiring the other set of heartbeat signals wirelessly through the computer network.

6. The method of claim 1 wherein detecting the interruption includes:
   detecting a timeout event in which no heartbeat signal is received within a timeout period; and
   wherein performing the remedial activity to coordinate the I/O operations among the multiple servers includes:
      in response to detecting the timeout event, prohibiting the server from performing further I/O operations.

7. The method of claim 1, further comprising:
   detecting a second interruption in receiving the second set of heartbeat signals from the identifying device while detecting the interruption in receiving the set of heartbeat signals from the server; and
   wherein performing the remedial activity to coordinate the I/O operations among the multiple servers includes:
      in response to detecting the second interruption in receiving the second set of heartbeat signals from the identifying device while detecting the interruption in receiving the set of heartbeat signals from the server, prohibiting the server from performing further I/O operations.

8. The method of claim 7 wherein another identifying device is coupled with another power transmission circuit constructed and arranged to deliver power to the server cluster, the other identifying device being constructed and arranged to provide a third set of heartbeat signals through the other power transmission circuit, the third set of heartbeat signals including a third identifier of the other identifying device, the third identifier being different from both the first identifier and the second identifier;
   wherein the method further comprises:
      after prohibiting the server from performing the further I/O operations, receiving the set of heartbeat signals from the server through the other power transmission circuit while receiving the third set of heartbeat signals from the other identifying device through the other power transmission circuit; and
   wherein performing the remedial activity further includes:
      after receiving the set of heartbeat signals from the server through the other power transmission circuit while receiving the third set of heartbeat signals from the other identifying device through the other power transmission circuit, allowing the server to perform the further I/O operations.

9. The method of claim 1 wherein the server cluster includes a power supply unit (PSU) and a signal adapter coupled with the PSU, the signal adapter being constructed and arranged to acquire the set of heartbeat signals from a power signal provided to the PSU; and
  wherein receiving the set of heartbeat signals through the power transmission circuit includes:
    receiving the power signal through the power transmission circuit, the power signal including the set of heartbeat signals and providing power to the PSU; and
    acquiring the set of heartbeat signals from the power signal.

10. The method of claim 1 wherein the server includes (i) a management controller constructed and arranged to coordinate the I/O operations among the multiple servers in the server cluster and (ii) a processor constructed and arranged to perform the I/O operations;
  wherein the set of heartbeat signals includes (i) a first set of signals of the management controller and (ii) a second set of signals of the processor; and
  wherein the method further comprises:
    after receiving the set of heartbeat signals through the power transmission circuit, identifying the first set of signals and the second set of signals included in the set of heartbeat signals.

11. The method of claim 1, wherein the identifying device includes a power inlet and a power outlet, the power inlet being coupled with the power transmission circuit, the power outlet providing pass-through power from the power inlet; and
  wherein the method further comprises:
    receiving the pass-through power via the power outlet of the identifying device along with the second set of heartbeat signals.

12. The method of claim 1, further comprising:
  while the interruption in receiving the set of heartbeat signals is ongoing, continuing to receive the second set of heartbeat signals from the identifying device; and
  identifying a first type of failure from a plurality of types of failures based on continuing to receive the second set of heartbeat signals while the interruption is ongoing.

13. A server cluster, comprising:
  multiple servers;
  memory; and
  control circuitry coupled to the memory, the memory storing instructions which, when carried out by the control circuitry, cause the control circuitry to perform a method of:
    receiving, from a server in the server cluster, a set of heartbeat signals through a power transmission circuit constructed and arranged to deliver power to the server cluster;
    detecting an interruption in receiving the set of heartbeat signals; and
    in response to detecting the interruption in receiving the set of heartbeat signals, performing a remedial activity to coordinate input/output (I/O) operations among the multiple servers in the server cluster;
  wherein the set of heartbeat signals includes a first identifier of the server in the server cluster;
  wherein an identifying device is coupled with the power transmission circuit, the identifying device being constructed and arranged to provide a second set of heartbeat signals through the power transmission circuit, the second set of heartbeat signals including a second identifier of the identifying device, the second identifier being different from the first identifier; and
  wherein the method further includes:
    while receiving the set of heartbeat signals from the server through the power transmission circuit, receiving the second set of heartbeat signals from the identifying device through the power transmission circuit.

14. The server cluster of claim 12 wherein the server cluster is constructed and arranged to perform the I/O operations to store host data into and retrieve the host data from a set of storage devices on behalf of a set of host computers; and
  wherein receiving the set of heartbeat signals includes:
    acquiring the set of heartbeat signals from the server while the I/O operations are performed.

15. The server cluster of claim 12 wherein a computer network couples the multiple servers in the server cluster with each other, the computer network being different from the power transmission circuit; and
  wherein the method further includes:
    communicating with the server through the computer network to coordinate performing the I/O operations with the server.

16. The server cluster of claim 15 wherein communicating with the server through the computer network includes:
    while receiving the set of heartbeat signals from the server through the power transmission circuit, receiving another set of heartbeat signals from the server through the computer network;
  wherein performing the remedial activity to coordinate the I/O operations among the multiple servers is further in response to detecting another interruption in receiving the other set of heartbeat signals through the computer network.

17. The server cluster of claim 16 further comprising a wireless transmitter constructed and arranged to provide signals through the computer network; and
  wherein receiving the other set of heartbeat signals from the server through the computer network includes:
    acquiring the other set of heartbeat signals wirelessly through the computer network.

18. The server cluster of claim 13 wherein the method further includes:
  detecting a second interruption in receiving the second set of heartbeat signals from the identifying device while detecting the interruption in receiving the set of heartbeat signals from the server; and
  wherein performing the remedial activity to coordinate the I/O operations among the multiple servers includes:
    in response to detecting the second interruption in receiving the second set of heartbeat signals from the identifying device while detecting the interruption in receiving the set of heartbeat signals from the server, prohibiting the server from performing further I/O operations.

19. The server cluster of claim 13 wherein the identifying device includes:
  a set of connectors coupled to the power transmission circuit;
  second memory; and
  processing circuitry coupled to the second memory and the set of connectors, the second memory storing instructions which, when carried out by the processing circuitry, cause the processing circuitry to provide the second set of heartbeat signals through the power transmission circuit via the set of connectors.

20. A computer program product having a non-transitory computer readable medium which stores a set of instructions to manage a server cluster that includes multiple servers, the set of instructions, when carried out by computerized circuitry, causing the computerized circuitry to perform a method of:

receiving, from a server in the server cluster, a set of heartbeat signals through a power transmission circuit constructed and arranged to deliver power to the server cluster;

detecting an interruption in receiving the set of heartbeat signals; and in response to detecting the interruption in receiving the set of heartbeat signals, performing a remedial activity to coordinate input/output (I/O) operations among the multiple servers in the server cluster;

wherein the set of heartbeat signals includes a first identifier of the server in the server cluster;

wherein an identifying device is coupled with the power transmission circuit, the identifying device being constructed and arranged to provide a second set of heartbeat signals through the power transmission circuit, the second set of heartbeat signals including a second identifier of the identifying device, the second identifier being different from the first identifier; and wherein the method further includes:

while receiving the set of heartbeat signals from the server through the power transmission circuit, receiving the second set of heartbeat signals from the identifying device through the power transmission circuit.

* * * * *